United States Patent
Lee et al.

(10) Patent No.: US 8,300,280 B2
(45) Date of Patent: Oct. 30, 2012

(54) IMAGE SCANNING APPARATUS AND METHOD

(75) Inventors: Jae-in Lee, Suwon-si (KR); Ki-hun Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 558 days.

(21) Appl. No.: 12/543,786

(22) Filed: Aug. 19, 2009

(65) Prior Publication Data

US 2010/0103477 A1 Apr. 29, 2010

(30) Foreign Application Priority Data

Oct. 23, 2008 (KR) .................. 10-2008-0104204

(51) Int. Cl.
*H04N 1/04* (2006.01)
(52) U.S. Cl. ......... 358/474; 358/497; 358/496; 358/498
(58) Field of Classification Search .................. 358/474, 358/496, 497, 498
See application file for complete search history.

(56) References Cited

U.S. PATENT DOCUMENTS

| | | | |
|---|---|---|---|
| 7,281,133 B2 * | 10/2007 | Ginter et al. | 713/176 |
| 2006/0114515 A1 * | 6/2006 | Kim | 358/3.28 |
| 2008/0037076 A1 | 2/2008 | Ohama et al. | |
| 2008/0117480 A1 * | 5/2008 | Huang et al. | 358/474 |
| 2009/0027738 A1 * | 1/2009 | Kim | 358/474 |

FOREIGN PATENT DOCUMENTS

JP 04-365259 12/1992

* cited by examiner

*Primary Examiner* — Houshang Safaipour
(74) *Attorney, Agent, or Firm* — Staas & Halsey LLP

(57) ABSTRACT

An image scanning apparatus and method accurately sense a leading edge and a tail edge of a scanned document and determine the leading margin and the tail margin of the document. The image scanning method includes feeding the document to a scanning position through a feeding path according to a command to scan the document; operating a sensor unit disposed on the feeding path according to a location of the document; scanning the document in response to operation of the sensor unit; sensing a leading edge of each document using a document sensing pattern disposed oppositely to the scanning unit; and scanning the document when the leading edge of the document is sensed.

19 Claims, 4 Drawing Sheets

ND METHOD

IMAGE SCANNING APPARATUS AND METHOD

CROSS-REFERENCE TO RELATED APPLICATION

This application claims the benefit of Korean Patent Application No. 10-2008-0104204, filed Oct. 23, 2008, in the Korean Intellectual Property Office, the disclosure of which is incorporated herein by reference.

BACKGROUND OF THE INVENTION

1. Field of the Invention

Aspects of the present invention relate to an image scanning apparatus and an image scanning method thereof, and more particularly, to an image scanning apparatus configured to accurately detect a leading edge and a tail edge of a document to be scanned, such as a manuscript, and calibrate leading and tail margins of the document.

2. Description of the Related Art

Generally, an image scanning apparatus illuminates light on a document to be scanned and scans an image formed on the document. By way of example, the image scanning apparatus includes a scanner, a facsimile, and a multi-functional printer having a scanning unit.

Image scanning apparatuses are classified into three types according to what is moved in order to scan the document: a flat-bed type image scanner, a sheet-feed type image scanner, and a hybrid type image scanner. A scanning unit of the scanner is moved in the flat-bed type image scanner, and a document is moved in the sheet-feed type image scanner. The hybrid type image scanner is similar to a sheet-feed type image scanner and is generally a flat-bed type image scanner having an auto document feeder (ADF) attached thereto to supply sheets to the scanner. Here, the scanner illuminates light on the document and scans a visible image formed on the document in the form of an optical signal, converts the scanned optical signal into an electric signal, and provides the electric signal to a signal processing module.

In performing an image scanning operation with respect to documents continuously fed by use of the document feeder, both the sheet-feed type image scanner and the hybrid image scanner detect the entrance of each document, the leading edge, and the tail edge of the document.

Accordingly, the conventional image scanning apparatus includes a first detector and a second detector disposed along a document feeding path of the document feeder. The first detector senses entrance of the document, and the first detector comprises a first actuator installed reciprocally and rotatably along the document feeding path, the first actuator being rotatable between a first position, when no document has entered the document feeding path, and a second position, when a document has entered the document feeding path. The first detector further comprises a first sensor to turn on or off according to the position of the first actuator. The second detector detects the leading and the tail edges of the document, and the second detector comprises a second actuator provided on the document feeding path between the first detector and a document scanning position, and a second sensor turning on or off according to the position of the second actuator. The second actuator is installed reciprocally and rotatably between a first position, when no document has entered a portion of the document feeding path at which the second actuator is disposed, and a second position, when a document has entered the portion of the document feeding path at which the second actuator is disposed.

Accordingly, the conventional image scanning apparatus calculates a start position and an end position of an image scanning operation according to on/off points of the second sensor, a distance between a detecting position and a scanning position, and the feeding speed of the document.

In the conventional image scanning apparatus, the second actuator contacts the fed document and is then rotated. Thus, a chattering phenomenon may be caused by a mechanical vibrating of the second actuator when the document and the second actuator contact each other. In addition, there may be a difference in time between when the document contacts the second actuator and when the second actuator rotates. Thus, errors may be caused between on/off points of the second sensor and the detection of the leading and the tail edges of the document.

Further, as the detecting positions of the leading and the tail edges of the document and the scanning position of the document are different in the conventional image scanning apparatus, it is not possible to detect the accurate positions of the leading and the tail edges of the document where the feeding speed of the document is not accurate. Moreover, the rotation direction of the second actuator when the second sensor turns on or off is opposite to the second sensor, and thus, the point of time when the second sensor turns on and the point of time when the second sensor turns off become different, thereby causing an error in the margins of the leading and the tail edges of the document.

SUMMARY OF THE INVENTION

Aspects of the present invention provide an image scanning apparatus and method to accurately sense a leading edge and a tail edge of a document fed through a document feeder unit through an improved sensing structure and to accurately determine the leading and the tail margins of the document.

According to aspects of the present invention, there is provided an image scanning method for an image scanning apparatus including a scanning unit to scan a document, the method including feeding the document to a scanning position through a feeding path according to a command to scan the document; operating a sensor unit disposed on the feeding path according to a location of the document; starting scanning of the document via the scanning unit in response to the operation of the sensor unit; sensing a leading edge of each document using a document sensing pattern disposed oppositely to the scanning unit; and scanning the document when the leading edge of the document is sensed.

According to aspects of the present invention, the scanning unit may scan the document sensing pattern until the leading edge of the document is sensed.

According to aspects of the present invention, the scanning of the document may start when the leading edge of the document passes between the document sensing pattern and the scanning unit.

According to aspects of the present invention, the image scanning method may further comprise stopping of the scanning of the document when a tail edge of the document passes between the document sensing pattern and the scanning unit.

According to aspects of the present invention, the stopping of the scanning of the document occurs when the scanning unit scans the document sensing pattern after the document passes between the document sensing pattern and the scanning unit.

According to aspects of the present invention, the document sensing pattern includes a plurality of bar-type patterns spaced apart from one another.

According to aspects of the present invention, the method may further include determining a point of time for the scanning unit to start the scanning of the document according to a size of the document.

According to aspects of the present invention, the image scanning method may further comprise displaying that the document is in the course of being scanned when the document is being scanned.

According to aspects of the present invention, there is provided an image scanning apparatus to scan a document, including a document feeder unit to feed the document to a scanning position through a feeding path the document feeder unit including a document sensing pattern; a scanning unit to scan the document, the scanning unit disposed opposite of the feeding path from the document sensing pattern; and a control unit to determine whether the document is being scanned according to the scanning result of the document sensing pattern, and to control the scanning unit to scan the document.

According to aspects of the present invention, the document feeder unit may comprise a guide unit to guide the document fed through the feeding path between the guide unit and the scanning unit; and the document sensing pattern may be formed on one side of the guide unit.

According to aspects of the present invention, the guide unit may comprise a guide plate having the document sensing pattern; and an elastic member to bias the guide plate toward the scanning unit.

According to aspects of the present invention, the document fed by the document feeder unit may be arranged at a center of the guide plate; and the document sensing pattern may be formed in a center of the guide plate.

According to aspects of the present invention, the control unit may control the scanning unit to start scanning the document at a different point of time according to a size of the document fed.

According to aspects of the present invention, the image scanning apparatus may further comprise a storage unit to store the different points of time to start scanning the document according to the size of the document, the different points of time being stored as a lookup table.

According to aspects of the present invention, the document feeder unit may further comprise a registration sensor unit to sense whether the document has entered into the scanning position.

According to aspects of the present invention, the document feeder unit may comprise a pickup roller to feed the document to the feeding path; and a feeding roller to transfer the fed document to the feeding path.

According to aspects of the present invention, the scanning unit may comprise an optical illumination system to illuminate light to the document; a sensor unit to scan images of the document; and an image forming lens unit to focus a light beam reflected from the document to the sensor unit.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
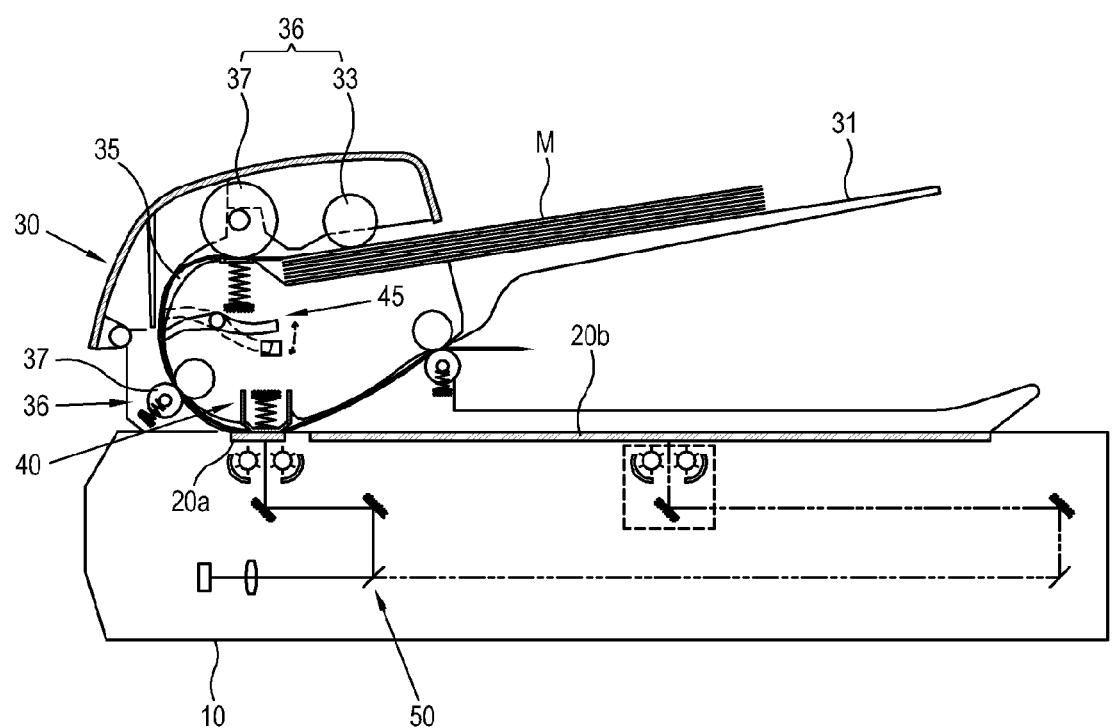
FIG. 1 is a schematic sectional view showing an image scanning apparatus including a document feeder unit (DFU) according to an exemplary embodiment of the present invention.

Reference will now be made in detail to exemplary embodiments of the present invention, examples of which are illustrated in the accompanying drawings, wherein like reference numerals refer to the like elements throughout. The embodiments are described below in order to explain the present invention by referring to the figures.

Figure 2:
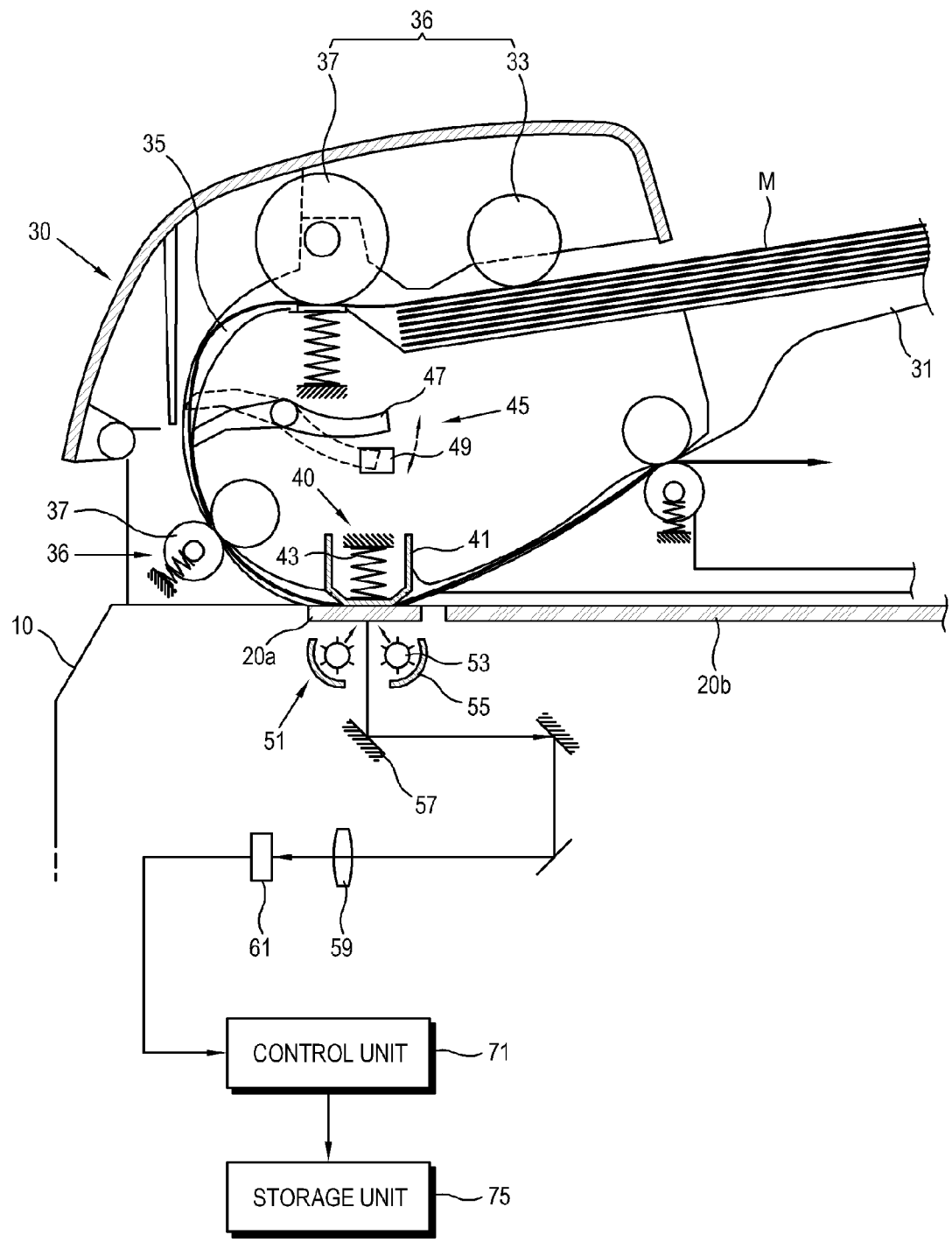
FIG. 2 is a schematic sectional view showing a main portion extracted from FIG. 1.
Figure 3:
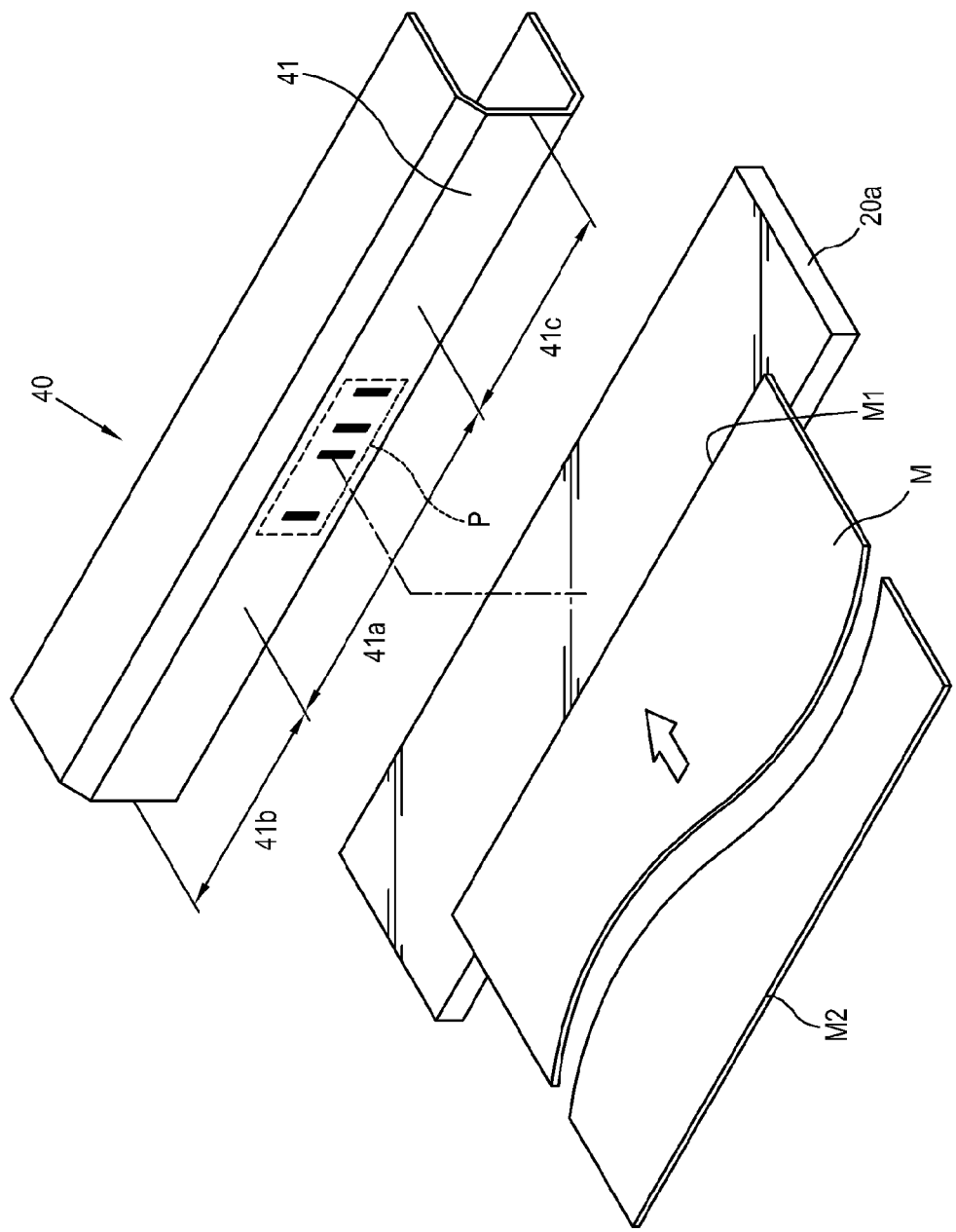
FIG. 3 is an exploded perspective view showing the main portion extracted from FIG. 1.

FIG. 1 is a schematic sectional view showing an image scanning apparatus including a document feeder unit (DFU) according to an exemplary embodiment of the present invention; FIG. 2 is a schematic sectional view showing a main portion extracted from FIG. 1; and FIG. 3 is an exploded perspective view showing the extracted main portion of FIG. 1. Referring to FIGS. 1 to 3, the image scanning apparatus includes a main body 10 having windows 20a and 20b through which an incident light passes, a document feeder unit 30 mounted on the main body 10 to pass documents over the window 20a, a scanning unit mounted within the main body 10, and a control unit 71.

FIGS. 1 and 2 illustrate a hybrid-type image scanner taken as an example, in which the window 20a may include a transparent glass in order to scan an image with respect to the document supplied through the document feeder unit 30, and the window 20b may include a flat-bed type transparent glass on which the document is set. The windows 20a and 20b are not limited to a configuration formed with the transparent glasses as shown in the drawings, but the windows 20a and 20b may be configured with an opening through which the incident light passes.

The document feeder unit 30 includes a document supplying unit 31 on which documents M to be scanned are loaded, a feeder 36 to feed one of the documents M supplied from the document supplying unit 31 along the document feeding path, and a guide unit 40 provided in the scanning position to guide the document M fed through the feeding path 35. The feeder 36 includes a pickup roller 33, and feeding rollers 37 provided on the feeding path. The pickup roller 33 is installed adjacent to the document supplying unit 31 to pick up the document M loaded on the document supplying unit 31 one by one and to supply the picked up document M to the feeding path. The feeding rollers 37 transfer the document M supplied from the document supplying unit 31, and the feeding rollers 37 are elastically biased by springs, as shown in FIGS. 1 and 2.

The guide unit 40 guides the document fed along the feeding path 35 to pass over the window 20a, and the guide unit 40 is disposed oppositely to the window 20a such that the document M passes between the guide unit 40 and the window 20a. The guide unit 40 includes a guide plate 41 disposed oppositely to the window 20a, and an elastic member 43 elastically biasing the guide plate 41 toward the window 20a. A document sensing pattern P as shown in FIG. 3 is formed on one side of the guide plate 41 opposite to the window 20a. The document sensing pattern P is provided in order to sense a leading edge position M1 and a tail edge position M2 of the document supplied through the paper feeding path 35 between the guide plate 41 of the guide unit 40 and the window 20a.

When no document M is fed, light reflected on the guide plate 41 opposite to the window 20a is sensed by a sensor unit 61 of the scanner 50, which will be described later. Accordingly, the sensor unit 61 scans the document sensing pattern P formed on the one side of the guide plate 41. When the document M passes over the window 20a, the light reflected on the document M is sensed by the sensor unit 61. Accordingly, the sensor unit 61 cannot read the document sensing pattern P when the document M is disposed between the document sensing pattern P and the window 20a.

As described above, by determining whether the document sensing pattern P can be read, a point of time when the leading edge position M1 and the tail edge position M2 of each document M can be accurately known. Different from the conventional image scanner apparatus, the leading edge position M1 and the tail edge position M2 of a document M can be accurately sensed even though the feeding speed of the document may not be accurately known by sensing the leading edge position M1 and the tail edge position M2 of the document M with the use of the document sensing pattern P disposed oppositely to the window 20a. By excluding an actuator rotated by physical contact with a document M, occurrence of the chattering phenomenon may be prevented.

FIG. 3 illustrates the document sensing pattern P in black with a plurality of bar-type patterns spaced apart from one another; however, such document sensing patter P is merely for illustration and may be different than shown. For example, the guide plate 41, i.e., the side opposite to the window 20a of the guide plate 41, may be of another color that may absorb an incident light (e.g., black), and have a white pattern to reflect the incidental light.

The document M fed through the document feeder unit 31 can vary in size, and each document M can be fed in various ways and orientations. For example, the document M may be arranged at the center, the left side, or the right side of the document supplying unit 31.

When the document M is arranged at the center, the document sensing pattern P may be formed centrally at the center 41a of the guide plate 41 so as to sense the leading and the tail positions M1 and M2 with respect to the document M of any size. When the document M is arranged at the left side or the right side, the document sensing pattern P may be formed on the left portion 41b or the right portion 41c of the guide plate 41. Further, the document sensing pattern P may be formed over the whole area of or entire surface of the guide plate 41, i.e., left, center, and right portions 41b, 41a, and 41c.

The document feeder unit 30 may further include a registration sensor unit 45 which senses whether a document M enters into the document feeding path 35 from the document supplying unit 31. In this case, the scanning unit 50 may start scanning of the document M at the same time when entrance of the document M is sensed by the registration sensor unit 45. The registration sensor unit 45 may include an actuator 47 reciprocally and rotatably disposed between a first position when no document M has entered the document feeding path 35 and a second position when a document M has entered the document feeding path 35, and a sensor 49 turning on or off according to the position of the actuator 47.

The scanning unit 50 scans the document M and includes an optical illumination system 51 to illuminate light to the document M positioned on the window 20a, the sensor unit 61, and an image forming lens unit 59. The scanning unit 50 may further include a plurality of reflecting mirrors 57 disposed to form a light path between the window 20a and the image forming lens unit 59. To scan an image with respect to the document M fed through the document feeder unit 30, the scanning unit 50 is fixedly installed under the window 20a at a position to scan the image, and/or the scanning unit 50 may be installed to scan the image while moving beneath the flat-bed type transparent window 20b and may include another optical illumination system 51 and another plurality of reflecting mirrors 57 to form a light path between the window 20b and the image forming lens unit 59.

The optical illumination system 51 illuminates light to the document M passing over the window 20a or set on the window 20b. The optical illumination system 51 includes a light source 53 to generate and illuminate light and a reflecting mirror 55 disposed at one side of the light source 53. The reflecting mirror 55 reflects radially the light illuminated from the light source 53 toward the document M.

The sensor unit 61 may be a charge coupled device (CCD) that scans information of the document M from an incident light beam by way of the reflecting mirrors 57. The image forming lens unit 59 is disposed between the reflecting mirrors 57 and the sensor unit 61 and focuses the light beam reflected from the reflecting mirrors 57 on the sensor unit 61.

The control unit 71 determines whether the document M has been scanned according to whether the scanning unit 50 has scanned the document sensing pattern P and controls the scanning unit 50 to scan the document M. That is, the control unit 71 senses at least one of the leading edge M1 and the tail edge M2 of a document M and, on this basis, controls at least one of the leading margin and the tail margin of the document M. For example, if the document M is positioned on a scanning position of the window 20a, the document M covers or blocks the document sensing pattern P, and thus, the sensor unit 61 cannot scan the document sensing pattern P. The control unit 71 determines a point of time at which the document sensing pattern P cannot be scanned to be a point of time when the leading position or edge M1 of the document M is sensed, and thereby allows the image data of the document M to be scanned.

Likewise, the document sensing pattern P becomes scannable through the window 20a at the moment when the document M passes through the window 20a, and the document sensing pattern P is sensed in the sensor unit 61. Accordingly, the control unit 71 determines a point of time when the document sensing pattern P is scanned to be a point of time when the tail edge position M2 of the document M is sensed, and ends scanning of the image data.

The document M fed into the image scanning apparatus may have diverse specifications, such as A4, A3, Regal, etc., in size. Thus, different documents M may have different leading margins dependent upon the size of the document M. Considering this, the control unit 71 may control the scanning unit 50 to start scanning of a document M according to its size by differentiating the starting points of a time to scan document. For this, the image scanning apparatus may include a storage unit 75 to store the starting points of time to scan the document according to size. Such information may be stored as a lookup table.

Meanwhile, in case where a film of transparent material, such as an overhead projector (OHP) film, is fed as a document M to be scanned and is positioned on the window 20a, the sensor unit 61 continuously scans the document sensing pattern P and thus the image scanning apparatus cannot sense the leading position M1 and the tail edge position M2 of the document M. Considering this, the image scanning apparatus according to aspects of the present invention may further comprise a second sensor unit as previously described with respect to the related art. Further, while the document M is being scanned, a notification may be displayed on a display of the image scanning apparatus or a terminal display indicating that the document M is being scanned.

Figure 4:
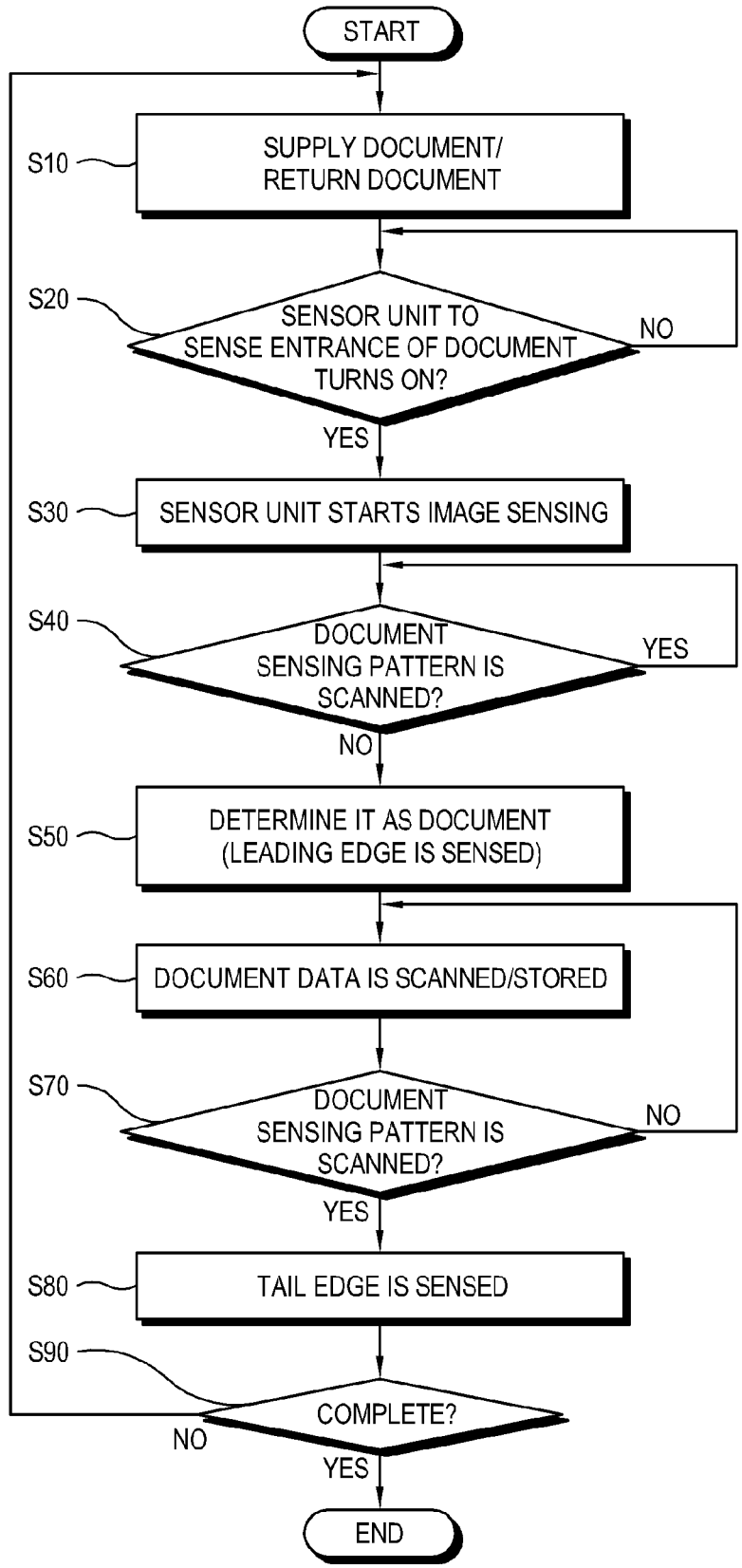
FIG. 4 is a flow chart explaining an image scanning method for the image scanning apparatus according to an exemplary embodiment of the present invention.

An image scanning method of the image scanning apparatus according to aspects of the present invention will be described in detail. FIG. 4 is a flow chart describing the image scanning method of the image scanning apparatus according to aspects of the present invention. Referring to FIGS. 1 through 4, if supplying and feeding of the document begins, at operation S10, the document placed on the document supplying unit 31 enters the feeding path 35 and is sensed by the registration sensor unit 45. At this time, the registration sensor unit 45 senses whether the document has entered into the feeding path at operation S20. When the document has entered into the registration sensor unit 45, the leading edge M1 of the document M contacts the actuator 47, causing the actuator 47 to be rotated, and changing a sensor 49 to be in an on state. In this case, the scanning unit 50 starts scanning of the document M through the sensor unit 61 at operation S30.

Subsequently, the sensor unit 61 senses the document sensing pattern P and determines whether data corresponding to the document sensing pattern P is scanned at operation S40. That is, the sensor unit 61 senses the document sensing pattern P until the document M reaches the scanning position, i.e., the window 20a, through the feeding path 35, and scans data corresponding to the document sensing pattern P; in this case, operation S40 is repeated. Accordingly, the scanning unit 50 scans the document sensing pattern P until the leading edge M1 of the document M is sensed.

If the document is positioned on the window 20a through the feeding path 35, thereby covering up the document sensing pattern P, the sensor unit 61 does not scan data corresponding to the document sensing pattern P, and thus, the control unit 71 determines that the leading edge M1 of the document has entered at this point of time at operation S50. Accordingly, the scanning unit 50 starts scanning of the document M from the point of time when the leading edge of the document passes through the document sensing pattern P and stores the data in a predetermined storage unit 75 at operation S60.

Here, the document fed into the image scanning apparatus may have diverse specifications, such as A4, A3, Regal, etc., in size. Thus, the respective document M may have different leading margins according to the size of the document M. Considering this, operation S60 may determine starting points of time when the scanning unit 50 scans the document to be different according to the respective size of the documents. Here, the starting points of time to scan the document may be determined with reference to a lookup table based on the document sizes stored in the storage unit 75.

After operation S60, aspects of the present invention may further include determining whether the document sensing pattern P is rescanned at operation S70. When rescanning of the document is not sensed, operation S60 is repeated.

If the tail edge M2 of the document passes through the window 20a, the document sensing pattern P is again exposed and sensed, and the sensor unit 61 rescans data corresponding to the document sensing pattern P. Accordingly, the scanning unit 50 determines that the tail edge position M2 of the document M has passed the scanning position, i.e., the window 20a, at this point in time, and ends scanning of the data with respect to the document M at operation S80.

According to aspects of the present invention, the scanning unit 50 determines whether to repeat the above operations with respect to the document subsequently supplied through the document supplying unit 31 at operation S90. When there are no more documents M to be scanned, the image scanning is ended. When there remains any document M to be scanned, operations S10 through S80 are repeated. Thus, it is possible to output the identical leading and tail margins M1 and M2 with respect to each sheet of the document M in scanning plural sheets of documents.

The scanning apparatus and method according to aspects of the present invention exclude an actuator rotated by physical contact with the document in a conventional manner, thereby simplifying an overall configuration thereof and preventing occurrence of the chattering phenomenon. In addition, the scanning apparatus and method according to aspects of the present invention can accurately sense the points of time when the leading and the tail edges M1 and M2 of the document M pass through a scanning position using a document sensing pattern P formed on the guide unit 40, and thus, the leading and the tail edges M1 and M2 of the document M can be accurately sensed even where the feeding speed of the document M is not uncertain. Accordingly, the document M can be scanned with the identical leading and tail margins with respect to each output in consecutively scanning image data from plural sheets of documents M.

Although a few embodiments of the present invention have been shown and described, it would be appreciated by those skilled in the art that changes may be made in these embodiment without departing from the principles and spirit thereof, the scope of which is defined in the appended claims and their equivalents.

What is claimed is:

1. An image scanning method for an image scanning apparatus including a scanning unit to scan a document, the method comprising:
   feeding the document to a scanning position through a feeding path according to a command to scan the document;
   operating a sensor unit disposed on the feeding path according to a location of the document;
   determining a point of time for the scanning unit to start the scanning of the document according to a size of the document;
   starting scanning of the document via the scanning unit in response to the operation of the sensor unit;
   sensing a leading edge of the document using a document sensing pattern disposed oppositely to the scanning unit; and
   scanning the document when the leading edge of the document is sensed.

2. The image scanning method of claim 1, wherein the scanning unit scans the document sensing pattern until the leading edge of the document is sensed.

3. The image scanning method of claim 1, wherein the scanning of the document starts when the leading edge of the document passes between the document sensing pattern and the scanning unit.

4. The image scanning method of claim 3, further comprising stopping the scanning of the document when a tail edge of the document passes between the document sensing pattern and the scanning unit.

5. An image scanning method for an image scanning apparatus including a scanning unit to scan a document, the method comprising:
   feeding the document to a scanning position through a feeding path according to a command to scan the document;
   operating a sensor unit disposed on the feeding path according to a location of the document;

starting scanning of the document via the scanning unit in response to the operation of the sensor unit;

sensing a leading edge of the document using a document sensing pattern disposed oppositely to the scanning unit;

scanning the document when the leading edge of the document is sensed; and stopping the scanning of the document when a tail edge of the document passes between the document sensing pattern and the scanning unit;

wherein the scanning of the document starts when the leading edge of the document passes between the document sensing pattern and the scanning unit; and wherein the stopping of the scanning of the document occurs when the scanning unit scans the document sensing pattern after the document passes between the document sensing pattern and the scanning unit.

6. The image scanning method of claim 1, wherein the document sensing pattern comprises a plurality of bar-type patterns spaced apart from one another.

7. The image scanning method of claim 1, further comprising displaying that the document is in the course of being scanned when the document is being scanned.

8. An image scanning apparatus to scan a document, the image scanning apparatus comprising:
- a document feeder unit to feed the document to a scanning position through a feeding path, the document feeder unit including a document sensing pattern;
- a scanning unit to scan the document, the scanning unit disposed opposite of the feeding path from the document sensing pattern; and
- a control unit to determine whether the document is being scanned according to a scanning result of the document sensing pattern, and to control the scanning unit to scan the document,
- wherein the control unit controls the scanning unit to start scanning the document at a different point of time according to a size of the document fed.

9. The image scanning apparatus of claim 8, wherein the document feeder unit comprises a guide unit to guide the document fed through the feeding path between the guide unit and the scanning unit; and
- the document sensing pattern is formed on one side of the guide unit.

10. The image scanning apparatus of claim 9, wherein the guide unit comprises a guide plate having the document sensing pattern; and
- an elastic member to bias the guide plate toward the scanning unit.

11. The image scanning apparatus of claim 10, wherein the document fed by the document feeder unit is arranged at a center of the document supplying unit; and
- the document sensing pattern is formed in a center of the guide plate.

12. The image scanning apparatus of claim 8, further comprising a storage unit to store the different points of time to start scanning the document according to the size of the document, the different points of time being stored as a lookup table.

13. The image scanning apparatus of claim 8, wherein the document feeder unit further comprises a registration sensor unit to sense whether the document has entered into the scanning position.

14. The image scanning apparatus of claim 8, wherein the document feeder unit comprises a pickup roller to feed the document to the feeding path; and
- a feeding roller to transfer the fed document to the feeding path.

15. The image scanning apparatus of claim 8, wherein the scanning unit comprises an optical illumination system to illuminate light to the document;
- a sensor unit to scan an image of the document; and
- an image forming lens unit to focus a light beam reflected from the document to the sensor unit.

16. The image scanning apparatus of claim 15, further comprising:
- a window disposed at the scanning position between the feeding path and the scanning unit, the scanning unit illuminating the light to the document through the window.

17. An image scanning method for an image scanning apparatus including a scanning unit to scan a document, the method comprising:
- determining a point of time for the scanning unit to start the scanning of the document according to a size of the document;
- sensing a document sensing pattern disposed opposite a scanning unit at a scanning position along a feeding path;
- passing the document through the scanning position to block the sensing of the document sensing pattern;
- scanning the document when the document sensing pattern is blocked by the document passing through the scanning position; and
- storing the scanned document in a storage unit.

18. The method of claim 17, further comprising: stopping the scanning of the document when the document sensing pattern is not blocked from the sensing thereof after the document completely passes through the scanning position.

19. An image scanning method for an image scanning apparatus including a scanning unit to scan a document, the method comprising:
- sensing a document sensing pattern disposed opposite a scanning unit at a scanning position along a feeding path;
- passing the document through the scanning position to block the sensing of the document sensing pattern;
- scanning the document when the document sensing pattern is blocked by the document passing through the scanning position; and
- storing the scanned document in a storage unit
- stopping the scanning of the document when a tail edge of the document passes between the document sensing pattern and the scanning unit;
- wherein the scanning of the document starts when the leading edge of the document passes between the document sensing pattern and the scanning unit; and
- wherein the stopping of the scanning of the document occurs when the scanning unit scans the document sensing pattern after the document passes between the document sensing pattern and the scanning unit.

* * * * *